United States Patent [19]

Farrell et al.

[11] Patent Number: 5,247,675
[45] Date of Patent: Sep. 21, 1993

[54] PREEMPTIVE AND NON-PREEMPTIVE SCHEDULING AND EXECUTION OF PROGRAM THREADS IN A MULTITASKING OPERATING SYSTEM

[75] Inventors: Joel A. Farrell, Endicott, N.Y.; Stephen E. Record, Ridgefield, Conn.; Brian K. Wade, Apalachin, N.Y.

[73] Assignee: International Business Machines Corporation, Armonk, N.Y.

[21] Appl. No.: 743,004

[22] Filed: Aug. 9, 1991

[51] Int. Cl.$^5$ .............................................. G06F 9/40
[52] U.S. Cl. ............................ 395/650; 364/DIG. 1; 364/281.3; 364/284.4; 364/281.7; 364/281.8
[58] Field of Search .................. 364/DIG. 1; 395/650

[56] References Cited

U.S. PATENT DOCUMENTS

| 3,614,745 | 10/1971 | Podvin et al. | 340/172.5 |
| 3,662,401 | 5/1972 | Collins et al. | 444/1 |
| 4,103,330 | 7/1978 | Thacker | 364/200 |
| 4,145,735 | 3/1979 | Soga | 364/200 |

(List continued on next page.)

FOREIGN PATENT DOCUMENTS

| 1277426 | 12/1990 | Canada . |
| 89104020 | 3/1989 | European Pat. Off. . |
| 90850040 | 1/1990 | European Pat. Off. . |
| 8909964 | 10/1989 | World Int. Prop. O. . |

OTHER PUBLICATIONS

Graham et al., "Multi Tasking Operating System", IBM Tech. Disc. Bulletin, vol. 31, No. 10, Mar. 1989, pp. 419-436.
IBM TDB vol. 22, No. 11, Apr. 1980, R. L. Abraham, "Conditional Unready Improves Multitask Synchronization", pp. 4991-4992.
IBM TDB vol. 31, No. 10, Mar. 1989, C. S. Graham et al., "Multi-Tasking Operating System", pp. 419-436.
IBM TDB vol. 32, No. 10A, Mar. 1990, F. L. Janis, "Reference Monitor-Creating An Application-Dependent Access Control Identity", pp. 444-445.
IBM TDB vol. 30, No. 12, May 1988, C. A. Dennis, "Synchronization Control Block Posting Mechanism", pp. 471-473.
IEEE 1982, Electrical Eng. & Computer Sciences, U. of Cal., Berkeley, Calif., 94720, J. K. Ousterhout, "Scheduling Techniques for Concurrent Systems" pp. 22-30.

Primary Examiner—Gareth D. Shaw
Assistant Examiner—A. Katbab
Attorney, Agent, or Firm—Arthur J. Samodovitz

[57] ABSTRACT

A multitasking operating system permits application programs (and their developers) to influence a schedule of execution of program threads which constitute the application programs by specifying parameters for the program threads. The parameters indicate each thread's priority level and dispatch class in which the thread resides. The application programs specify the thread's parameters based on the following principles of the operating system. The operating system queues the highest priority thread available for execution from each dispatch class onto a run list for execution by a processor. The highest priority thread on the run list is executed first. While this thread is dispatchable and being executed, no other thread from the same dispatch class can preempt it unless this executing thread voluntarily relinquishes control of the processor, even if the other thread has a higher priority. (This other thread would have been created or made available after the currently executing thread was selected for the run list.) However, the currently executing thread can be involuntarily preempted at any time by another higher priority, available thread from a different dispatch class. A thread can also voluntarily relinquish control of its processor at other appropriate points in the execution, for example, when data structures are valid, to share the processor with other lower priority threads from the same or different dispatch classes.

12 Claims, 11 Drawing Sheets

U.S. PATENT DOCUMENTS

| | | | |
|---|---|---|---|
| 4,152,761 | 5/1979 | Louie | 364/200 |
| 4,286,322 | 8/1981 | Hoffman et al. | 364/200 |
| 4,318,173 | 3/1982 | Freedman et al. | 364/200 |
| 4,333,144 | 6/1982 | Whiteside et al. | 364/200 |
| 4,369,494 | 1/1983 | Bienvenu et al. | 364/200 |
| 4,394,725 | 7/1983 | Bienvenu et al. | 364/200 |
| 4,395,757 | 7/1983 | Bienvenu et al. | 364/200 |
| 4,468,736 | 8/1984 | DeSantis et al. | 364/200 |
| 4,493,022 | 1/1985 | Nicolas et al. | 364/200 |
| 4,512,628 | 3/1985 | Briggs | 364/200 |
| 4,590,555 | 5/1986 | Bourrez | 364/200 |
| 4,642,756 | 2/1987 | Sherrod | 364/200 |
| 4,658,351 | 4/1987 | Teng | 364/200 |
| 4,661,900 | 4/1987 | Chen et al. | 364/200 |
| 4,794,526 | 12/1988 | May et al. | 364/200 |
| 4,800,521 | 1/1989 | Carter et al. | 364/900 |
| 4,901,230 | 2/1990 | Chen et al. | 364/200 |
| 4,954,948 | 9/1990 | Hira et al. | 364/200 |
| 4,974,159 | 11/1990 | Hargrove et al. | 364/200 |
| 4,985,831 | 1/1991 | Dulong et al. | 364/200 |
| 5,001,666 | 3/1991 | Thompson et al. | 364/900 |

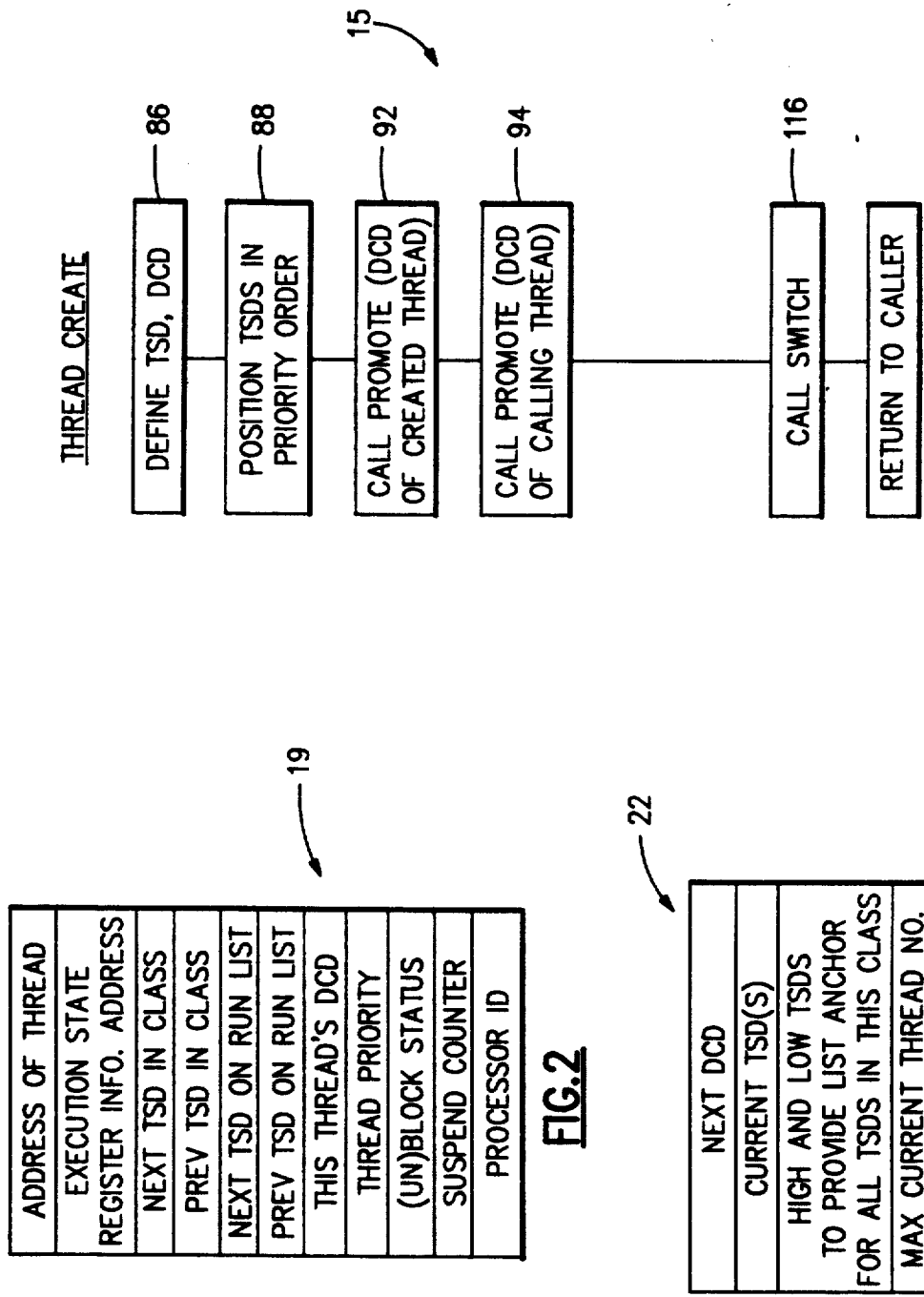

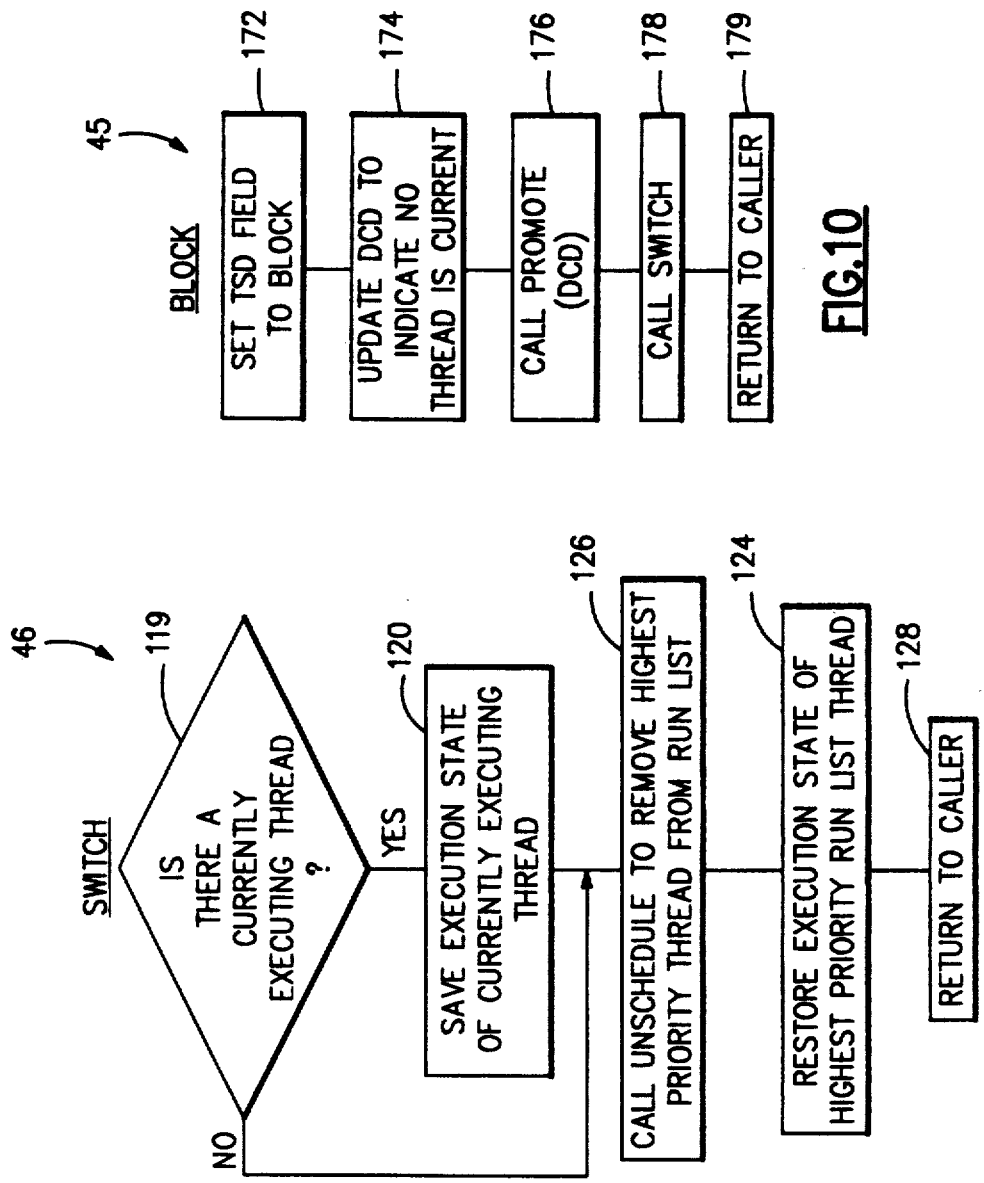
FIG. 10
FIG. 9
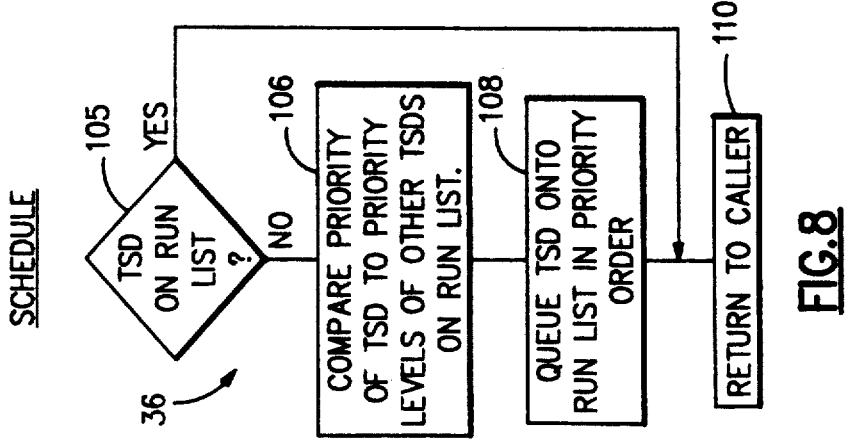
FIG. 8

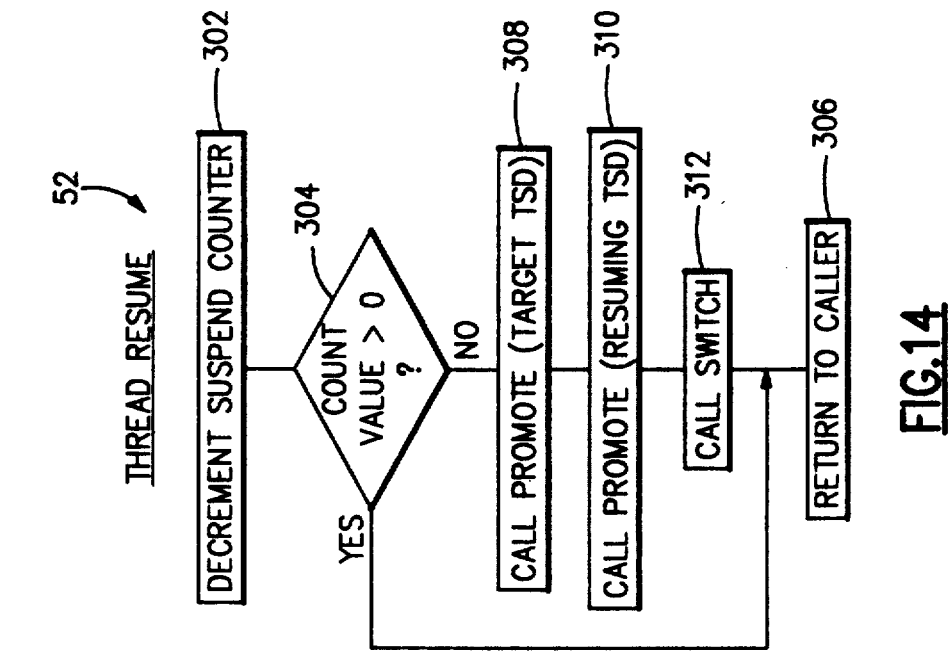
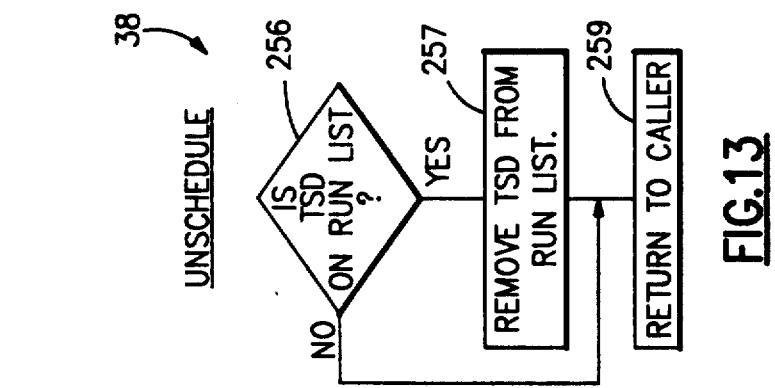
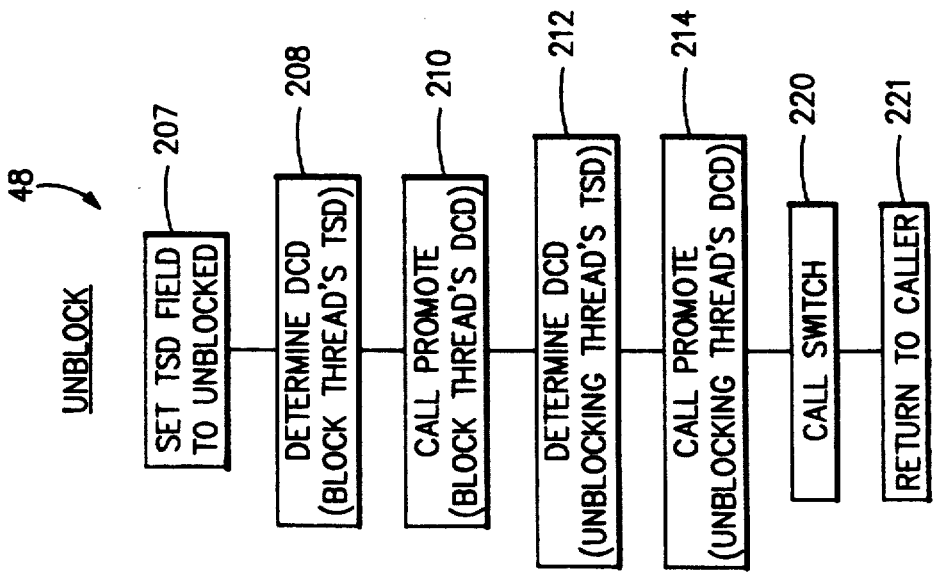

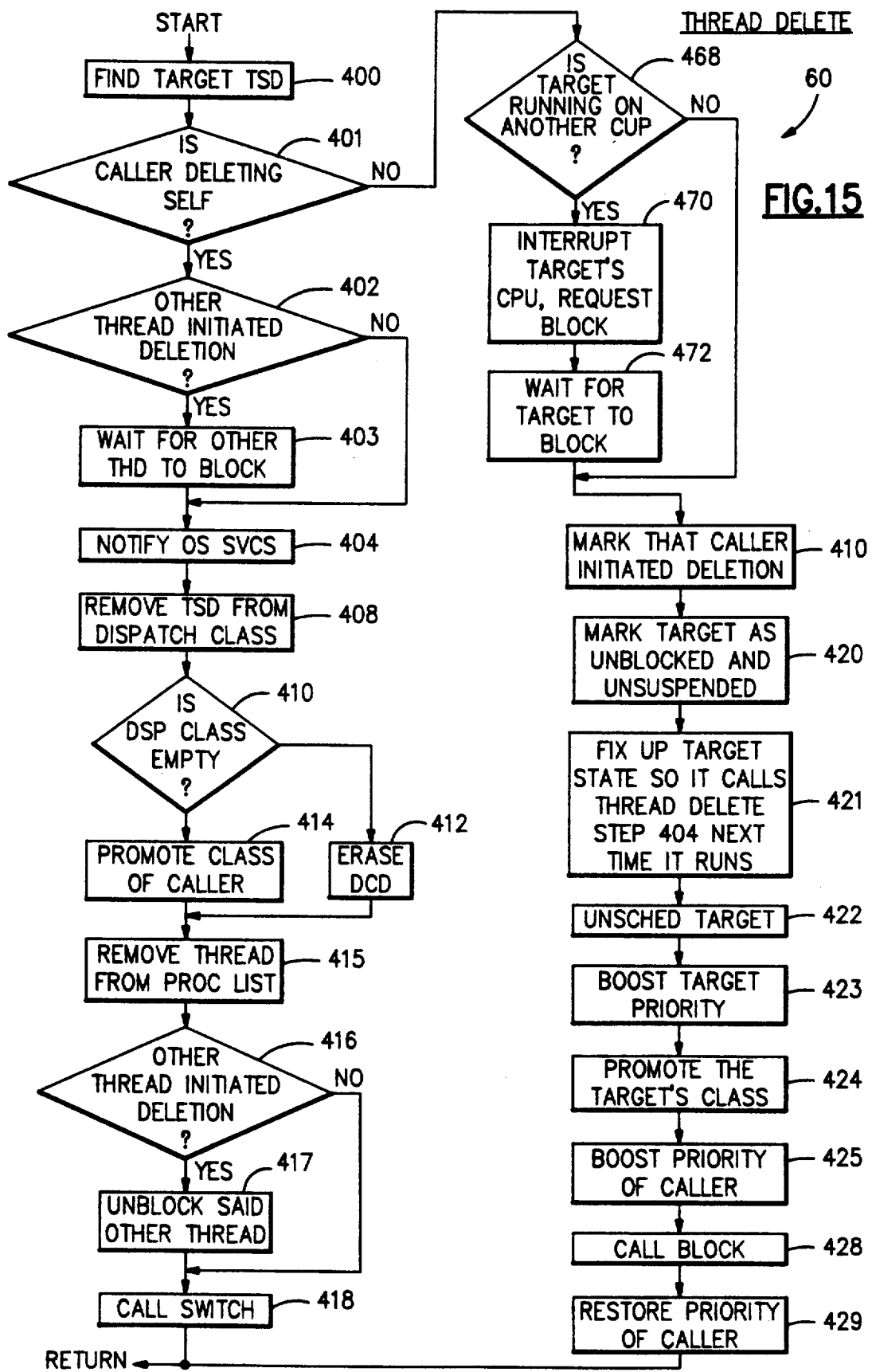

PREEMPTIVE AND NON-PREEMPTIVE SCHEDULING AND EXECUTION OF PROGRAM THREADS IN A MULTITASKING OPERATING SYSTEM

BACKGROUND OF THE INVENTION

The invention relates generally to computer operating systems, and deals more particularly with scheduling of computer program threads for execution in a multitasking operating system.

Single tasking operating systems have been available for many years. In such systems, a computer processor executes computer programs or program subroutines serially, i.e. no computer program or program subroutine can begin to execute until the previous one terminates. This type of operating system does not make optimum use of the computer processor in a case where an executing computer program or subroutine must wait for the occurrence of an external event (such as availability of data or a resource) because processor time is wasted. This problem led to the advent of multitasking or multithreaded operating systems in which each computer program is divided into one or more program threads or streams of execution. Each of the program threads performs a specific task. While a computer processor can execute only one program thread at a time, if the thread being executed must Wait for the occurrence of an external event, i.e. the thread becomes "non dispatchable", execution of the non-dispatchable thread is suspended and the computer processor executes another thread of the same or different computer program to optimize use of itself. Multitasking operating systems have also been extended to multiprocessor environments where threads of the same or different programs can execute in parallel on different computer processors. While such multitasking operating systems optimize the use of the one or more processors, they do not permit the application program developer to adequately influence the scheduling of execution of threads.

U.S. Pat. No. 4,395,757 discloses an information structure called a "semaphore" which is available to an application program developer and serves as a signalling mechanism to coordinate or synchronize a computer process and an event or resource. The semaphore indicates the presence of events or resources waiting for a process to utilize them, or alternately, the presence of a process waiting for events or resources. If more than one event or resource, or process is present at one time, they may be queued awaiting the matching process, or event or resource, respectively.

U.S. Pat. No. 4,658,351 discloses the use of priority levels and semaphores to coordinate tasks in a multitasking operating system. Multiple task queues are established, one for all tasks which are ready to run and have the same priority level. A task control block is generated to represent each task and is stored in the task queue corresponding to the task's priority level. Apparently the sequence of the task control blocks in each task queue is based upon the order in which the corresponding task became ready to run. Tasks are executed in a sequence depending upon the relative priorities of the task queues and upon the locations of the task control blocks in each task queue. Event signalling and message passing are handled by semaphores.

A publication entitled "Scheduling Techniques for Concurrent Systems" by John K. Ousterhout in the Proceedings of the Third International Conference on Distributed Computing Systems, 1982 discloses that program threads are organized into different classes. During a time "slice", all dispatchable program threads from one class or a fragment of the dispatchable threads in one class are executed concurrently on a like number of processors. At the end of a time slice, all executing threads are preempted by other dispatchable threads.

While the foregoing techniques permit an application program developer to influence the order of execution, further improvements are deemed important to permit greater control by the application program developer. Generally, controls placed upon the execution order of the threads, by either the operating system or the application program developer, decrease operating efficiency. Ideally, the operating system should schedule the execution of the threads in as efficient a manner as permitted by the application program.

A general object of the present invention is to provide a multitasking operating system which optimizes the execution of threads, while permitting application programs to substantially influence the execution schedule.

Another object of the present invention is to provide a multitasking operating system of the foregoing types which can operate in either a single processor or multiprocessor computer system.

SUMMARY OF THE INVENTION

The invention resides in a multitasking operating system which permits application programs (and their developers) to influence a schedule of execution of program threads derived from the application programs by specifying parameters for the program threads. The parameters indicate each thread's priority level and dispatch class in which the thread resides. Based on these parameters, the operating system schedules threads for execution in the following fashion. The operating system queues the highest priority thread which is available for execution from each dispatch class onto a run list for execution by a processor. The highest priority thread on the run list is executed first. While this thread is dispatchable and being executed, no other thread from the same dispatch class can preempt it unless this executing thread voluntarily relinquishes control of the processor, even if the other thread has a higher priority. (This other thread would have been created or made available after the currently executing thread was selected for the run list). However, the currently executing thread can be (involuntarily) preempted at any time by another higher priority, available thread from a different dispatch class. A thread can also be programmed to voluntarily relinquish control of its processor at other appropriate points in the execution, for example, when data structures are valid, to share the processor with other lower priority threads from the same or different dispatch class.

The invention operates as follows. The operating system organizes each thread into the class specified by the application program that created the thread. Each class includes at least one thread. The operating system identifies the highest priority thread which is available for execution from each class and positions these threads on the run list for execution by one or more processors. The highest priority thread on the run list is taken off the run list and executed first. This thread continues to execute until it becomes non-dispatchable, completes execution, is preempted by a higher priority thread from another dispatch class (which was created or made available after the currently executing thread began execution) or voluntarily relinquishes control to the highest priority available thread from any dispatch class. In all of these cases, the run list can be updated before the preemption occurs to permit newly created or newly available threads to vie for the processor.

BRIEF DESCRIPTION OF THE FIGURES

FIG. 2 illustrates the fields of a thread state descriptor (TSD) which is created to specify parameters of a program thread for use by the operating system of FIG. 1.

FIG. 3 illustrates the fields of a dispatch class descriptor (DCD) which is created to organize the thread state descriptors of FIG. 1.

FIG. 5 is a flowchart illustrating a ThreadCreate function within the operating system of FIG. 1.

FIG. 8 is a flowchart illustrating a Schedule primitive function within the operating system of FIG. 1.

FIG. 9 is a flowchart illustrating a Switch primitive function within the operating system of FIG. 1.

FIG. 10 is a flowchart illustrating a Block primitive function within the operating system of FIG. 1.

FIG. 11 is a flowchart illustrating an Unblock primitive function within the operating system of FIG. 1.

FIG. 13 is a flowchart illustrating an Unschedule primitive function within the operating system of FIG. 1.

FIG. 14 is a flowchart illustrating a ThreadResume function within the operating system of FIG. 1.

FIG. 15 is a flowchart illustrating a ThreadDelete function within the operating system of FIG. 1.

DETAILED DESCRIPTION OF THE PREFERRED EMBODIMENTS

Figure 1:
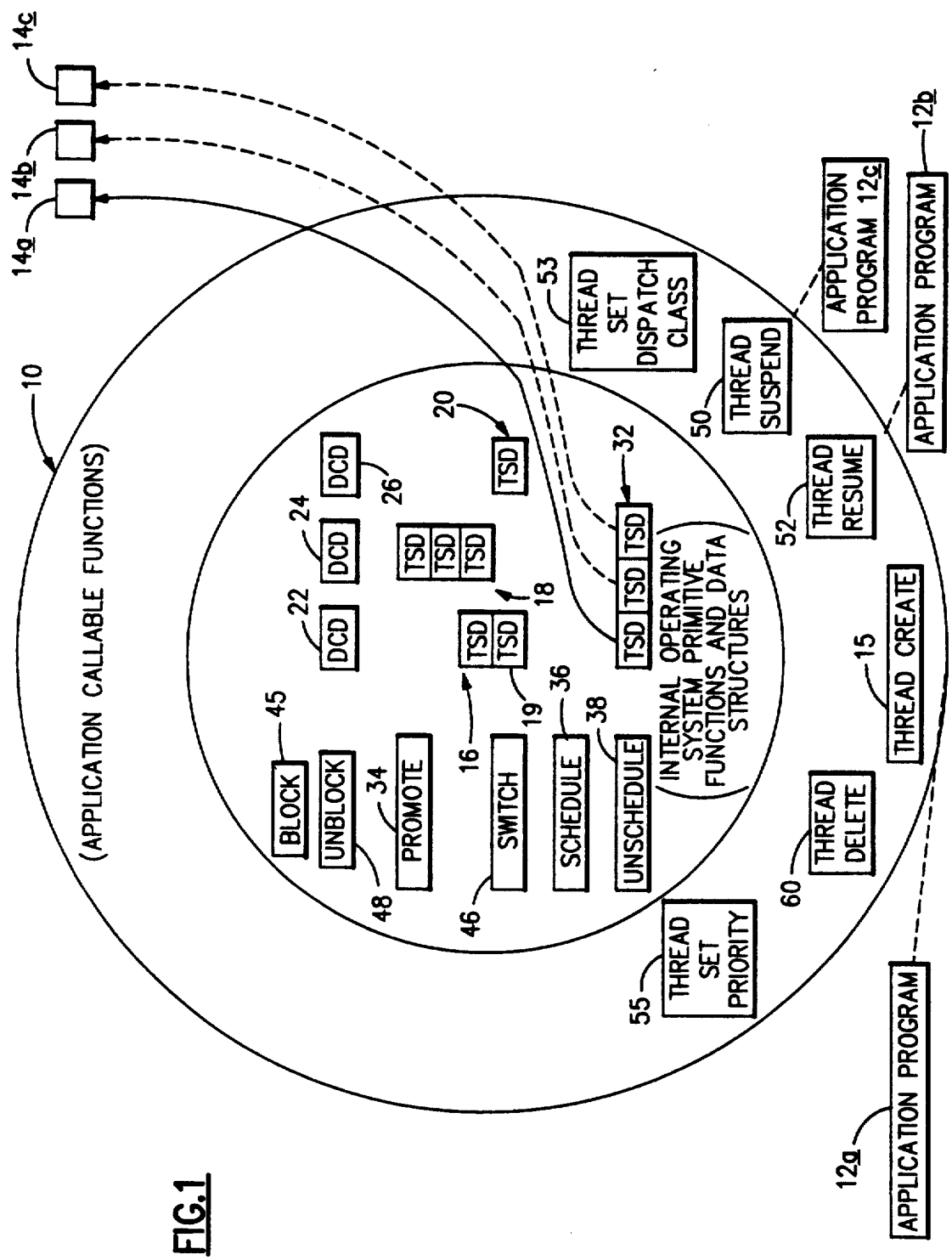
FIG. 1 is a block diagram illustrating components of a multitasking operating system which schedule program threads for execution according to the present invention.

Referring now to the figures in detail wherein like reference numerals indicate like elements throughout the several views, FIG. 1 illustrates a multitasking operating system generally designated 10 and associated computer processors 14a-c application programs 12a-c. The operating system 10 is preferably programmed in executable form onto a computer readable medium such as a magnetic disk or tape, loaded into a computer memory and executed on one or more of the CPUs 14a-c. However, the operating system 10 or part thereof could also be implemented by equivalent hardware. Operating system 10 can be used in a variety of types of computer systems including personal computers, mainframes (virtual machine and non-virtual machine types) etc., and provides such standard functions as interprocess communications, timing services, abnormal end handling, tracing and accounting functions. In addition, operating system 10 is programmed according to the present invention to schedule execution of application program threads constituting one or more of the application programs 12a, 12b and 12c with efficient use of one or more of the CPUs 14a-c. Operating system 10 permits the application programs to substantially influence the schedule of execution of their threads.

To begin the process of executing the application program threads, application programs 12a, 12b and 12c call ThreadCreate function 15 once for each thread to be created, to define to the operating system the threads which constitute the respective application programs. Each thread is composed of a sequence of program steps obtained directly from the respective application program and other subroutines provided by operating system 10 in response to calls by the program steps and executed in one common stream.

The call to the ThreadCreate function includes the following parameters:

1) the address of the first instruction of the thread (the address was determined when the application program was loaded into memory),
2) an initial priority level of the thread,
3) an indicator of the dispatch class in which the thread should reside, and
4) other parameters such as data for use or processing by the thread.

The application programs (as written by application program developers) select each thread's priority and dispatch class based on the following principles of operating system 10: (1) the highest priority available (i.e. unblocked and unsuspended) thread from each dispatch class is queued on a run list 32 for execution, (2) the highest priority thread on the run list is executed first, (3) no thread in any dispatch class can preempt any other executing thread in the same dispatch class, (4) an unblocked and unsuspended thread in any dispatch class can preempt a lower priority executing thread in a different dispatch class, (5) an executing thread in any dispatch class can voluntarily relinquish control to the highest priority, unblocked and unsuspended thread which may be in the same or different dispatch class, and (6) an executing thread blocks itself and loses control to another thread from the same or different dispatch class if the thread encounters a non dispatchable situation. The term "preemption" means the act of one thread substituting itself for another executing, dispatchable thread on the CPU. The threads in a dispatch class may be part of the same or different application programs or processes within one application program. Likewise, the threads in a single process may reside in different dispatch classes.

In response to the call, the ThreadCreate function 15 in step 86 of FIG. 5 creates a thread state descriptor (TSD) 19 to describe the thread in a form usable by the operating system. If the thread is the first in the dispatch class, the ThreadCreate function also creates a dispatch class descriptor (DCD) to describe a dispatch class in which the thread resides. Each thread resides in one dispatch class at any one time as defined by the application program which created the thread. FIG. 1 illustrates only three dispatch classes 16, 18 and 20 although typically many more dispatch classes are created to execute multiple application programs. The ThreadCreate function also positions or chains the TSDs in each dispatch class in order of their relative priority level (step 88). If the newly created thread has a priority equal to the priority of one or more threads already residing in the class, then the TSD of the newly created thread is placed in the dispatch class list after the TSDs of threads of like priority.

As illustrated in FIG. 2, each TSD 19 identifies the thread's address, execution state, position in the dispatch class (by designating the next and previous TSDs in the class), and the thread's dispatch class, priority level, and status, i.e., blocked, unblocked, suspended, unsuspended. Each TSD also identifies a next TSD on the run list 32 and a previous TSD on the run list to form the run list 32.

As illustrated in FIG. 3, the DCD identifies a "next" DCD to provide the linkage between DCDs, and a "current" TSD which is the highest priority unblocked and unsuspended thread in the dispatch class (at the time it is designated as current). The current TSD identifies the thread which is either currently executing on the CPU 14 or currently resides on the "run" list 32 waiting for subsequent execution by the CPU when the CPU is available. The DCD also identifies high and low pointers which point to the highest and lowest priority threads within the dispatch class to provide an "anchor" for referencing the dispatch class.

Figure 4:
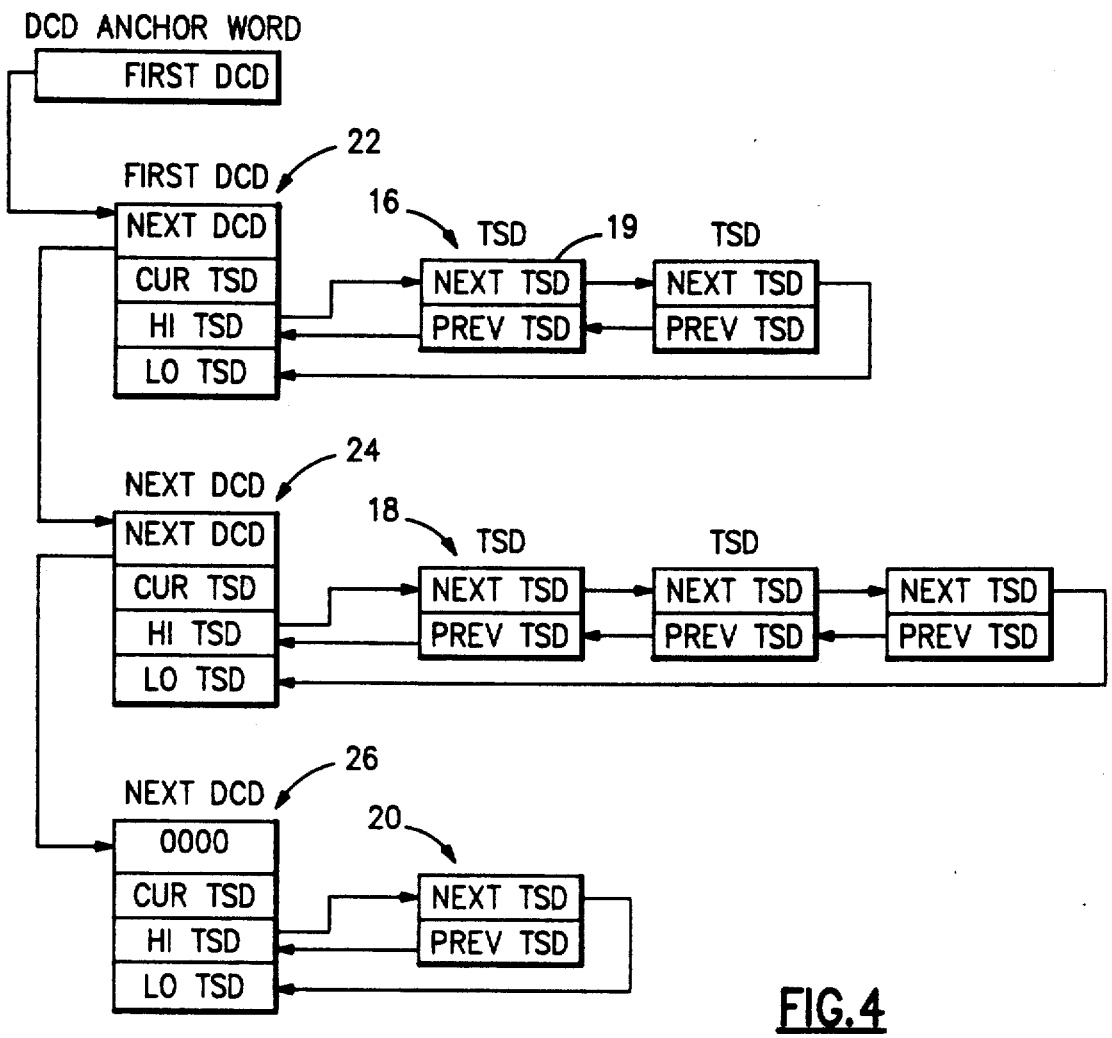
FIG. 4 illustrates chaining of thread state descriptors within each dispatch class of FIG. 1 and linking of all of the dispatch classes to each other.

FIG. 4 illustrates chaining of the TSDs, and linkage of the DCDs (which is in no particular order). All the TSDs within each dispatch class are arranged in a doubly-chained to facilitate reordering the list, and all of the DCDs in the system are chained together in a singly-linked manner.

Figure 6:
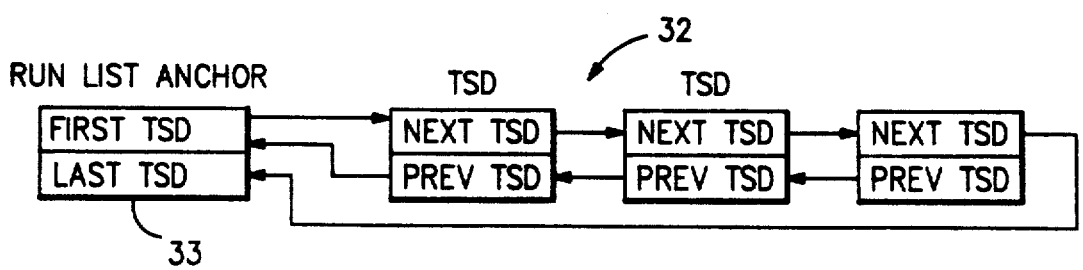
FIG. 6 illustrates chaining of thread state descriptors to form a run list within the operating system of FIG. 1.

The run list 32 comprises the current thread from each dispatch class that is waiting to run on the CPU. As illustrated in FIG. 6, the threads are arranged on the run list in priority order with double chaining from an anchor 33 which indicates the first and last TSD on the run list. If two threads on the run list have the same priority, they are positioned in order of time of arrival on the run list, later arrivals being positioned after earlier arrivals.

The following describes an embodiment of the invention in which only one thread from each dispatch class can be current at any one time; however, as described in more detail below in reference to another embodiment of the present invention, more than one thread from one dispatch class can be current at one time and execute concurrently on different CPUs.

Figure 7:
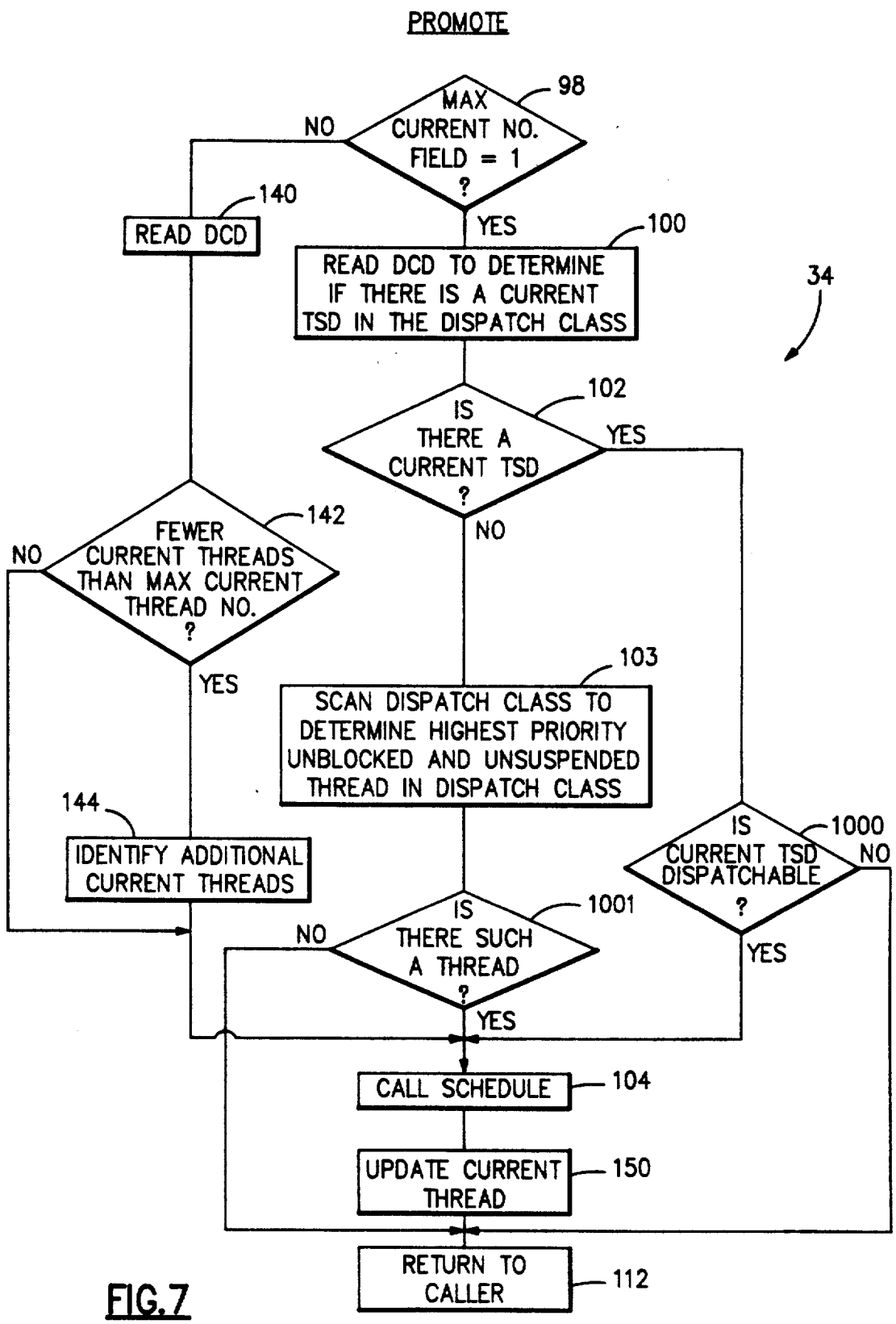
FIG. 7 is a flowchart illustrating a Promote primitive function within the operating system of FIG. 1.

After each thread is created and organized into a dispatch class by the ThreadCreate function in steps 86 and 88, the ThreadCreate function begins the scheduling of the thread by calling a Promote primitive function 34 illustrated in FIG. 7, identifying the DCD of the dispatch class in which the thread resides (step 92 of FIG. 5). Because in this embodiment of the invention only one thread from each dispatch class can be current at any time, decision block 98 of FIG. 7 leads to step 100 in which the Promote primitive function reads the DCD of the identified dispatch class to determine if a TSD from the dispatch class is designated as current. If so (decision block 102), and if the current TSD is dispatchable (decision block 1000), then the Promote primitive function branches to step 104 to queue the current TSD into the run list because in the preferred embodiment of the invention, no thread in any dispatch class can preempt a current thread in the same dispatch class regardless of the relative priority levels. Also, no thread in any dispatch class can be queued on the run list while another thread from the same dispatch class is current. However, if there is not a thread designated as current from the identified dispatch class, then the Promote primitive function reads the TSDs within the identified dispatch class in descending priority level (the order within the chain) to identify the highest priority TSD which is neither blocked nor suspended (step 103). If such a thread exists, (decision block 1001) it becomes the current TSD and the Promote primitive function calls a Schedule primitive function 36 and identifies the current thread (step 104). The Schedule primitive function 36 determines if the thread is already on the run list (decision block 105 of FIG. 8). If not, the Schedule primitive function reviews the priority levels of the other (if any) TSDs on the run list (step 106), and queues the TSD of the current thread onto the run list in priority order relative to the current threads from the other dispatch classes which are already on the run list (step 108). The Schedule primitive function then returns to the caller, in this case the Promote primitive function (step 110). In response, the Promote primitive function updates a current thread count described in more detail below (step 150), and then returns to its caller, the ThreadCreate function. Next, the ThreadCreate function calls the Promote primitive function identifying the DCD of the thread which called the ThreadCreate function (step 94) and the steps of FIGS. 7 and 8 are repeated for this other dispatch class. Thus, from each dispatch class which does not already have a current TSD identified, the operating system selects the highest priority unblocked and unsuspended thread (TSD), denotes the thread (TSD) as the current thread, and queues the TSD onto the run list 32. If the dispatch class has no threads which are available for execution (unblocked and unsuspended), then the dispatch class is not represented on the run list.

Because the run list is now changed, it is possible that a thread on the run list has a higher priority than the currently executing thread. Therefore, all the threads in the run list are now permitted to contend for the CPU. Accordingly, the ThreadCreate function calls the Switch primitive function 46 to initiate execution of the highest priority TSD on the run list (step 116). The first step of the Switch primitive function is to determine if a thread is currently executing on the CPU (decision block 119 of FIG. 9). If so, the Switch primitive function saves the execution state of the currently executing thread by copying the contents of the associated CPU registers into the currently-executing thread's TSD (step 120). These registers indicate the program step at which the program thread was halted, and the locations of stored data associated with the program thread. This state information will be necessary to resume execution of the program thread at a later time. If there was no thread currently executing on the CPU when the Switch primitive function was called, then decision block 119 avoids step 120.

Next the Switch primitive function calls an Unschedule primitive function 38 to remove the TSD of the highest priority thread from the run list. Because of step 108 of the previously called Schedule primitive function, said highest priority thread is necessarily the first thread on the run list. After verifying that the TSD is actually on the run list (decision block 256 of FIG. 13), the Unschedule primitive function removes it from the run list by changing the chain pointers between the run list anchor and the second highest priority thread on the run list to point to each other, omitting the highest priority TSD (step 257). Then, the Unschedule primitive function returns to the caller (step 259), and the Switch primitive function restores the execution state of the thread obtained from the run list into the CPU registers (step 124), causing the CPU to resume executing the thread at the point where the CPU left off processing the thread during its last period of execution (step 128). If this is the first instance in which the highest priority thread has been executed or dispatched, then the thread is executed from its beginning.

The foregoing example illustrates that a thread may continue to run on a CPU until it is preempted by a higher priority program thread from a different dispatch class. The preemption can occur at any time that the Promote and Switch primitive functions are called. The Promote and Switch primitive functions can be called even when the currently executing thread is dispatchable. However, if the highest priority thread in the system is from the same dispatch class as the one that is currently executing on the CPU (due to this highest priority thread being created or made available after the currently executing program thread began execution), then this highest priority thread will not be queued onto the run list unless and until the currently executing thread is blocked, is suspended by itself or another program thread or is deleted. This provides coordination between threads within the same dispatch class in accordance with an object of the present invention.

An executing thread blocks itself when it must wait for some condition to become satisfied before it can continue. This will permit another dispatchable thread from the same or different dispatch class to execute, and thereby make optimum use of the CPU. For example, if the currently executing program thread calls a routine implementing operating system services to obtain data from a queue and the data is not available, the operating system service routine, which is executing on the currently executing program thread, is programmed to block the currently executing program thread in the following manner. The operating system service routine places itself onto a list of threads waiting on the queue, and then calls a Block primitive function 45 within the operating system to block its own thread. In response, the Block primitive function 45 sets a block status field in the currently executing program thread's TSD (step 172 of FIG. 10), and then updates the currently executing program thread's DCD to indicate that there is no current thread in the dispatch class (step 174). Then, the Block primitive function calls the Promote primitive function for the dispatch class of the newly blocked thread (step 176). Decision block 102 of the Promote primitive function indicates that there is now no current thread for this dispatch class so one should be selected, if available, in step 103 to replace the blocked thread. Thus, the Promote primitive function, in conjunction with the Schedule primitive function 46 that it calls in step 104, queues the highest priority program thread, if any, which is unblocked and unsuspended from the dispatch class onto the run list. However, because the currently executing program thread is now blocked, it cannot be a candidate for currency and cannot be copied onto the run list regardless of its priority level. Next, the Block primitive function 44 calls the Switch primitive function 46 to select the highest priority thread on the run list for execution by the CPU in the manner noted above. Because the TSD of the currently executing thread is not now on the run list, it cannot be selected for subsequent execution and will be removed from the CPU in step 120. It is possible that another thread from the same dispatch class as the blocked one will be the highest priority thread on the run list and execute.

If another thread subsequently generates data for the queue, it will examine the list of program threads waiting for the data on the queue. Then, the thread which generated the data will remove the waiting thread from the queue wait list, and unblock the waiting thread by calling an Unblock primitive function 48, identifying the TSD of the blocked, waiting thread. In response, the Unblock primitive function changes the waiting thread's TSD indicator to remove the block notation (step 207 of FIG. 11), and determines the dispatch class in which the now unblocked waiting thread's TSD resides by examining the unblocked thread's TSD (which contains a pointer to the DCD) (step 208). Then, the Unblock primitive function calls the Promote primitive function (step 210) identifying the DCD of the now unblocked thread to copy this thread or a higher priority unblocked and unsuspended thread from the same dispatch class onto the run list if the dispatch class has no current thread at this time. After receiving the return from the Promote primitive function, the Unblock primitive function 48 determines the dispatch class of the thread which generated the data (step 212), and calls the Promote primitive function 34 to promote the dispatch class of the thread which generated the data (step 214). After the Promote primitive function 34 returns to the Unblock primitive function, the Unblock primitive function calls the Switch primitive function 46 (step 220) to execute the highest priority thread which is either on the run list or on the CPU, in the manner noted above. After the Switch primitive function returns to the Unblock primitive function, the Unblock primitive function returns to its caller, the data generating thread (step 221).

As noted above, the Block primitive function can be called by a service routine which is executing on the currently executing thread when the thread must wait for a resource to become available or some other event to occur. A thread can also be "suspended" by itself or another thread to halt or prevent execution of the thread. The thread which is the target of the suspension can currently be executing on the CPU, reside on the run list or reside elsewhere within a dispatch class and have blocked or unblocked status. A suspension can be used to cause a sharing of the CPU by other threads that have the same or lower priority or for other purposes. For example, a thread which updates a video screen can be suspended to "freeze" the frame.

Each TSD includes a "suspend counter" field which indicates the number of program threads which have requested suspension of the target thread represented by the TSD. If the counter is greater than zero, then the thread indicated by the TSD is suspended.

Figure 12:
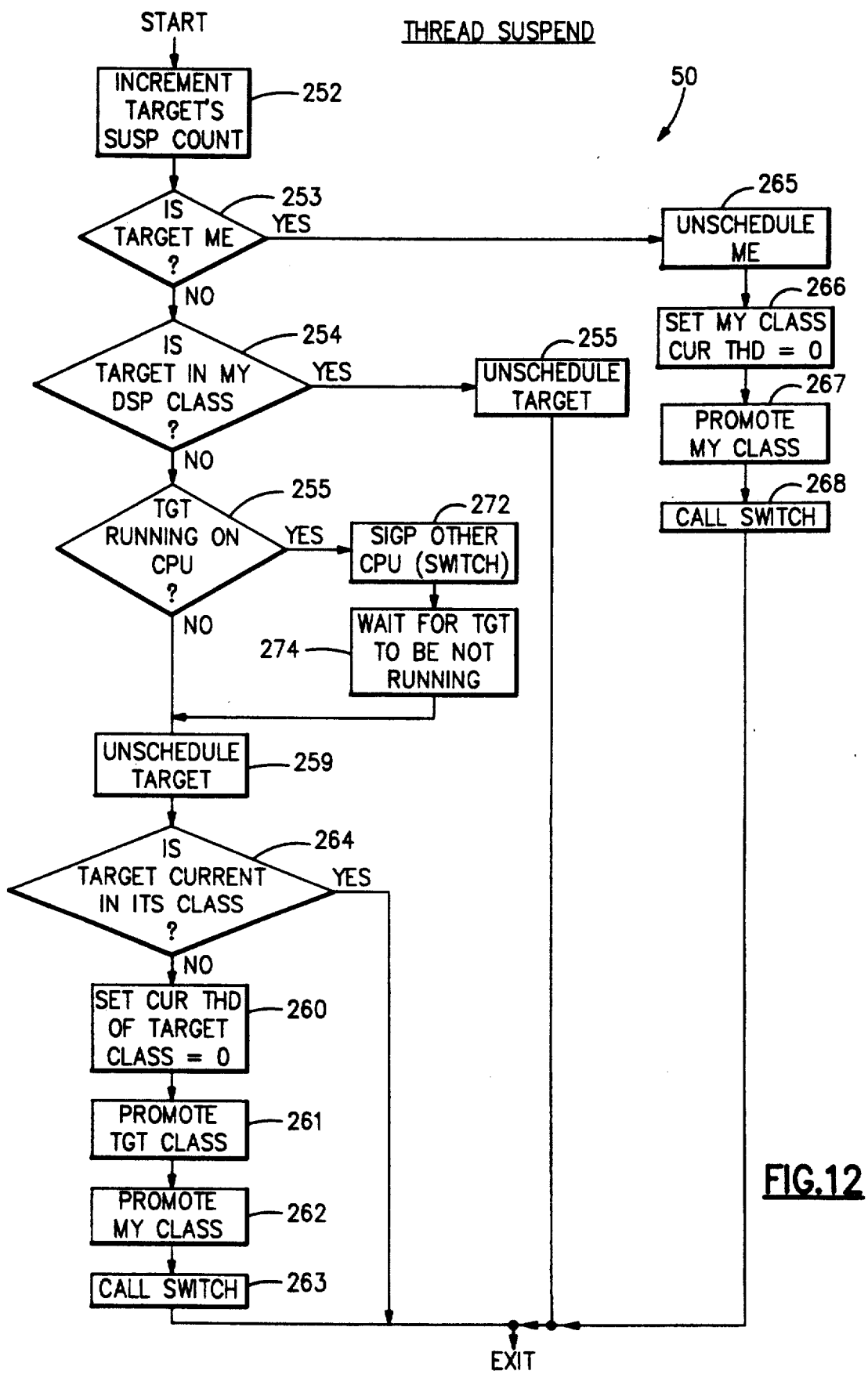
FIG. 12 is a flowchart illustrating a ThreadSuspend function within the operating system of FIG. 1.
Figure 16:
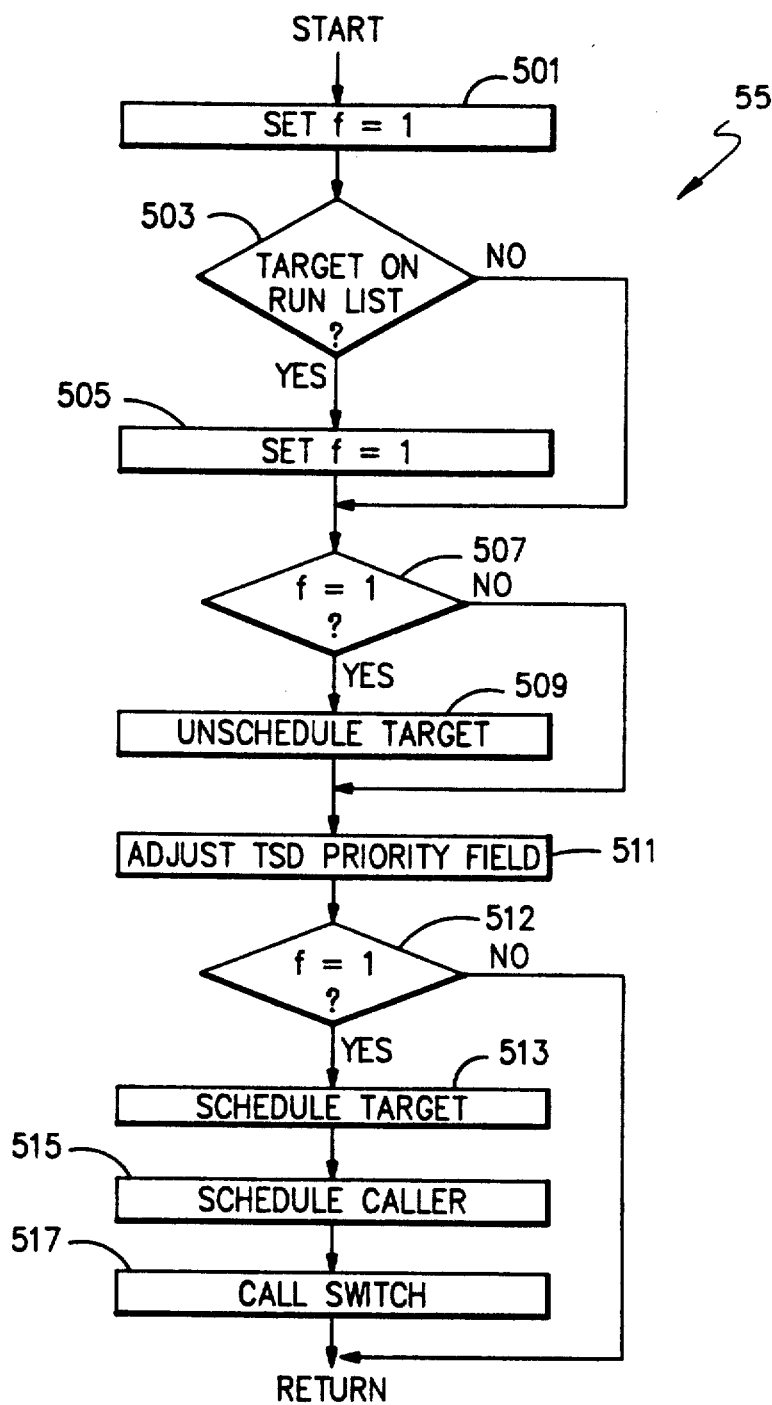
FIG. 16 is a flowchart illustrating a ThreadSetPriority function within the operating system of FIG. 1.

When a program ("suspending") thread wants to suspend a target thread, the suspending thread calls a ThreadSuspend function 50 illustrated in FIG. 12 with an identification of the target thread. First, the Thread-Suspend function increments the suspend counter of the target thread's TSD (step 252). If the suspending thread is not suspending itself (decision block 253), the ThreadSuspend function determines whether the target thread is in the same dispatch class as the suspending thread (decision block 254). If so, the ThreadSuspend function calls an Unschedule primitive function (Step 255) to remove the target thread from the run list if it is on the run list (decision block 256 and step 257 of FIG. 13). The Target thread could only be on the run list in a co-scheduling, multiprocessor embodiment of the present invention as described in more detail below. If the target thread is not in the same dispatch class, decision block 254 leads to decision block 258 in which the ThreadSuspend function determines if the target thread is currently executing on a CPU (again, in a multiprocessor embodiment). If not, the ThreadSuspend function 50 calls the Unschedule primitive function 38 identifying the target thread to remove the target thread from the run list if the target thread is on the run list (step 259). After receiving the return, the ThreadSuspend function determines if the target thread is current in its class (decision block 264), and if so changes the current TSD field in the target thread's DCD to indicate that no thread is current (step 260). Next, the ThreadSuspend function calls the Promote primitive function 34 to promote the dispatch class of the target thread (step 261). Because the target thread is now suspended, the next highest priority thread within the target thread's dispatch class that is not blocked or suspended will become current. Then, the Promote primitive function calls the Schedule primitive function to copy the new current thread from the suspended thread's dispatch class onto the run list. After receiving the return from the Promote primitive function, the ThreadSuspend function 50 calls the Promote primitive function to promote the dispatch class of the suspending program thread because the new thread from the target thread's dispatch class may possess a higher priority (step 262). Then, the ThreadSuspend function calls the Switch primitive function (step 263).

Referring again to decision block 253, if the suspending thread is suspending itself, the ThreadSuspend function calls the Unschedule primitive function to remove its TSD from the run list. While the ThreadSuspend function's TSD should not be on the run list, this step is a safeguard (step 265). Next, the ThreadSuspend function changes the current TSD field in its own DCD to indicate that no thread is current (step 266), promotes its own class (step 267), and calls the Switch primitive function (step 268).

Because a suspended thread cannot run, it cannot decrement its own suspend counter field and therefore must rely on another program thread to decrement the suspend counter field. When this other thread, running on CPU 14, desires to resume the suspended thread, this other thread calls a ThreadResume function 52, identifying the suspended thread. In response, the ThreadResume function 52 decrements the suspend counter field of the suspended program thread's TSD (step 302 of FIG. 14). If the count value is still greater than zero (decision block 304), then the ThreadResume function 52 returns to the currently executing program thread (step 306). However, if the suspend counter field now exhibits a count of zero, then the ThreadResume function 52 calls the Promote primitive function 34 to promote the dispatch class of the previously suspended thread and thereby give the resumed thread a chance to become current (step 308). After receiving the return, the ThreadResume function 52 calls the Promote primitive function to promote the dispatch class of the currently executing program thread (step 310). Because the resumed thread may be of higher priority than the resuming thread, the ThreadResume function 52 calls the Switch primitive function 46 (step 312) to execute the highest priority thread on the run list or CPU, in the manner described above, and then returns to the caller (step 306).

It should be noted that at any time, a currently executing program thread can be preempted by another, higher priority thread within another dispatch class pursuant to a Promote and Switch call made by any of the other functions 15, 48, 50, 52 and 60.

When a thread completes execution, it can either call a ThreadDelete function 60 directly or return to the operating system which will call the ThreadDelete function. In response to the call, the ThreadDelete function 60 locates the target thread's TSD (step 400 of FIG. 15), and then determines if the calling thread is deleting itself (decision block 401). If so, the ThreadDelete function determines if the deleting/target thread initiated the deletion (or as described below, another thread forced the thread to call the ThreadDelete function) (decision block 402). If another thread initiated the deletion, then the ThreadDelete function waits for the initiating thread to block itself (step 403) and then calls all kernel subsystems that require notification of the deletion of the thread (step 404). Next, the ThreadDelete function removes the target TSD from the dispatch class in which it resides (step 408). If the dispatch class is now empty (decision block 410), then the ThreadDelete function deallocates the DCD as well (step 412). If the dispatch class is not empty, then the ThreadDelete function calls the Promote primitive function for the target thread's dispatch class to permit another thread from the target thread's dispatch class to become current (step 414). After receiving the return, the ThreadDelete function removes the target thread's TSD from a list of threads that comprise the associated process (step 415). If the deleted thread initiated the deletion (decision block 416), then the ThreadDelete function calls the Switch primitive function to execute another thread (step 418). However, if another thread initiated the deletion, then the ThreadDelete function resets the block indicator in the initiating thread's TSD and calls the Promote primitive function to operate on the initiating thread's dispatch class before calling the Switch primitive function.

Referring again to decision block 401, if the thread targeted for deletion is not the calling thread, but instead, the target thread is executing on some CPU or is not current (decision block 468), then the ThreadDelete function stores the identity of the deleting thread in the TSD of the target thread (step 419), changes the status of the target thread to unblocked and unsuspended, if it was blocked or suspended, respectively (step 420), and changes the execution state of the target thread such that the field which normally indicates where the target thread shall resume execution instead indicates the location of step 400 of the ThreadDelete function (step 421). Next, the ThreadDelete function unschedules the target thread (step 422) and boosts the priority of the target thread.

Next, the ThreadDelete function calls the Promote primitive function for the dispatch class of the target thread (step 424) and then boosts the priority of the calling thread for fast completion (step (425). Next, the ThreadDelete function calls the Block primitive function 45 to block itself awaiting completion of the deletion (step 428) and then restores the priority of the calling thread (step 429). The effect of steps 420-428 is to cause the target thread to proceed to the CPU for execution soon. When execution begins, the CPU proceeds to execute steps 404-418 described above, the only additional consideration being that the target thread must unblock the deleting thread prior to deleting itself.

Operating system 10 also includes a ThreadSetPriority function 55 which can be called to adjust the priority of a thread. In response to the call, the ThreadSetPriority function sets a parameter 'f' equal to zero (step 501) and then determines if the target thread is on the run list (decision block 503). If so, the ThreadSetPriority function increments the parameter 'f' (step 505). Next the function examines 'f' (decision block 507) and unschedules the target (step 509) if f=1. Next, the ThreadSetPriority function changes the priority field of the TSD to the level specified by the caller (step 511), and if the thread was on the run list (decision block 512), schedules the target (step 513), schedules the caller (step 515) and calls the Switch primitive function (step 517).

Figure 17:
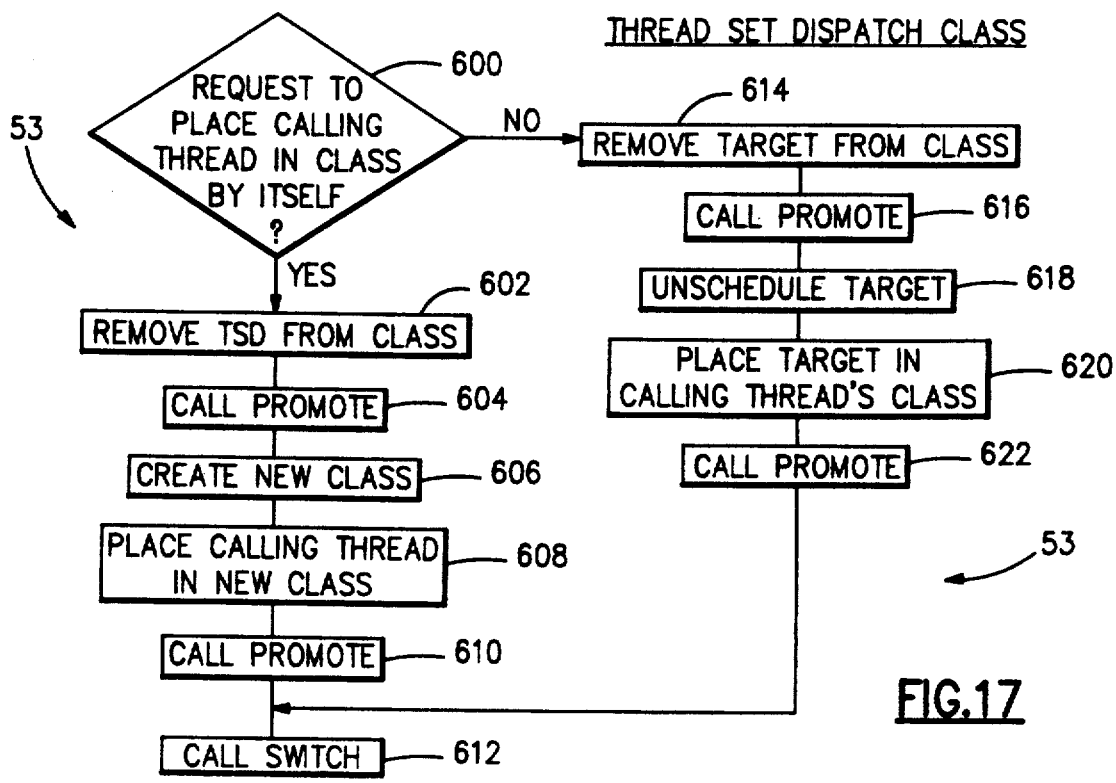
FIG. 17 is a flowchart illustrating a ThreadSetDispatchClass function within the operating system of FIG. 1.

Operating system 10 also includes a ThreadSetDispatchClass function 53 which is illustrated in FIG. 17 and can be called to place the calling thread in a dispatch class by itself or place another thread in the same dispatch class as the calling thread (decision block 600). In the former case, the ThreadSetDispatchClass function removes the calling thread from the calling thread's current dispatch class by changing the chain pointers (step 602), calls the Promote primitive function for this current dispatch class (step 604), creates a new dispatch class (step 606), places the calling thread's TSD in the dispatch class by changing the chain pointers (step 608), calls the Promote primitive function for the new dispatch class (step 610), and finally calls the Switch primitive function (step 612) In the latter case, the ThreadSetDispatchClass function removes the target thread from the target thread's current dispatch class (step 614), calls the Promote primitive function for this current dispatch class by changing the chain pointers (step 616), removes the target thread's TSD from the run list (if it is queued there) by calling the Unschedule primitive function (step 618), adds the target thread's TSD to the calling thread's dispatch class (step 620), calls the Promote primitive function for the calling thread's dispatch class (step 622), and finally calls the Switch primitive function (step 612).

Operating system 10 also includes a ThreadYield function 61 which allows a currently executing program thread to relinquish control of the CPU without blocking or suspending itself or otherwise becoming non-dispatchable. The currently executing thread can call the ThreadYield function to request that a specific thread in its class, indicating by a thread ID, be made current or that the highest priority available thread in its dispatch class (which may still be itself) be made current. In the later case, the call to the ThreadYield function is intended to permit the most important work (thread) from the dispatch class to be executed. However, in either case, the call to the ThreadYield function will not guarantee that the specified thread or the highest priority dispatchable thread in the dispatch class is executed immediately, only that the selected thread be immediately made current. An application program developer may code a call to the ThreadYield function at any point in the program thread where another thread in the same dispatch class should execute. For example, if a program thread is long running and there is a likelihood that another higher priority thread will be made available during the execution of the long running thread, the long running thread may include a call to the ThreadYield function.

Figure 18:
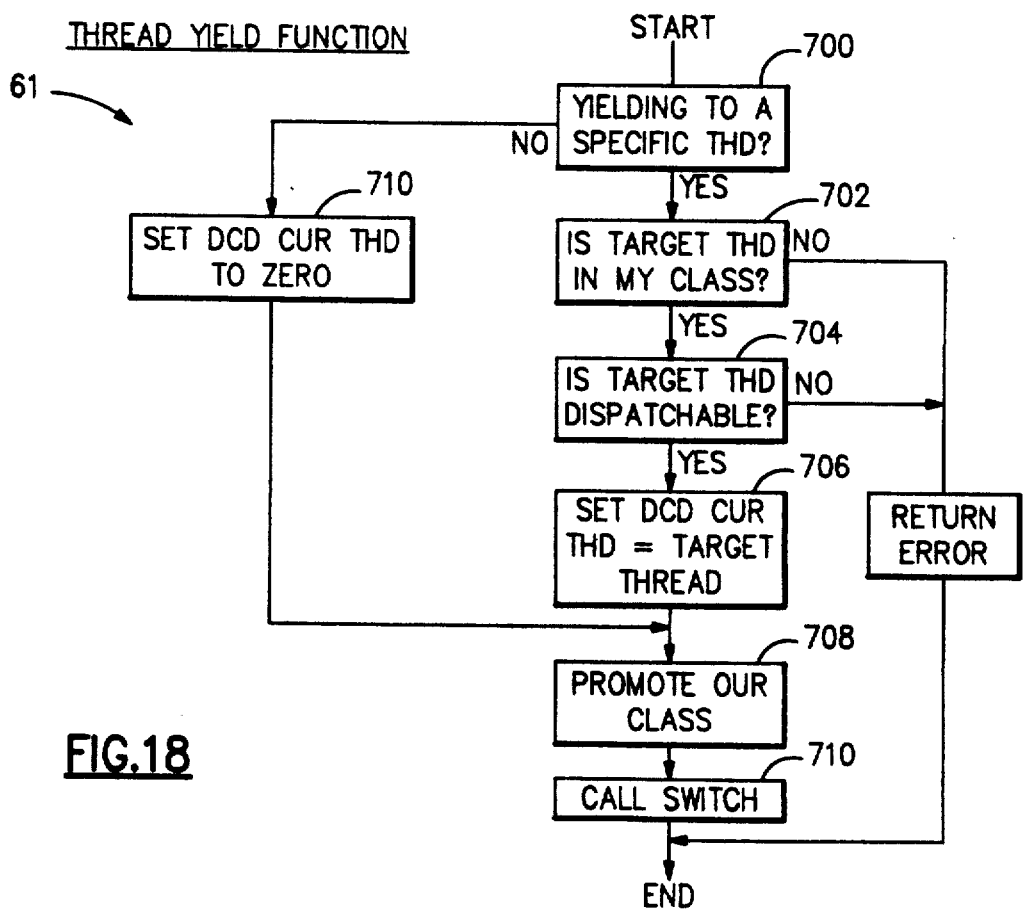
FIG. 18 is a flowchart illustrating a ThreadYield function within the operating system of FIG. 1.

FIG. 18 illustrates the ThreadYield function 61. After receiving the call, the ThreadYield function determines if the call specifies a particular (target) program thread in the same class to be made current (decision block 700). If so, the ThreadYield function verifies that the target thread is in the same dispatch class (decision block 702) and that the target thread is available or dispatchable (decision block 704). If both of the verifications are true, then the ThreadYield function sets the current thread field of the corresponding DCD to indicate the TSD of the target thread (step 706), promotes the class of the target thread (step 708) and then calls the Switch primitive function (step 710). Thus, the specified target thread will be promoted to the run list, the currently executing thread will be removed from the CPU because it is not on the run list when the Switch primitive function was called, and the highest priority thread on the run list will be executed. This highest priority thread on the run list may or may not be the target thread.

Referring again to decision block 700, if the call to the ThreadYield function does not specify a particular target thread, then the ThreadYield function sets the current thread field of the DCD to zero (step 712) and then jumps to 708 and 710 to promote the class and call the Switch primitive function, respectively. Thus, the highest priority available thread in the dispatch class is queued onto the run list and contends for the CPU. If the thread which called the ThreadYield function has the highest priority, then it will be made current because this thread is still available.

The present invention can also utilize multiple CPUs 14a, b, c to execute multiple program threads concurrently. To use multiple CPUs, it is necessary to ensure that only one CPU can manipulate a particular data structure (TSD, DCD or run list) at any one time. Otherwise, an invalid data structure could result. Consequently, when a program thread running on one CPU wants to manipulate a data structure, the program thread acquires or sets a lock associated with the data structure. A well-known compare and swap instruction is used to obtain a lock in one instruction cycle to avoid race conditions. No other program thread running on another CPU can manipulate the data structure until the lock is reset by the program thread which set it. For read mode operation, the lock is identified as read mode which allows other program threads to read but not update the data structure. For write mode operation, the lock is identified as write mode which prohibits other readers or writers from accessing the locked data structure. These types of locking arrangements are well known in the art. In the embodiment illustrated in FIG. 1, there is one "thread" lock for all TSDs and DCDs, and another for the entire run list. As a result, when a program thread running on any CPU obtains control of the thread lock for any of these types of data structures, then no other program thread running on any CPU can manipulate any of the data structures.

A lock is required for the foregoing functions 45, 48, 50, 52 and 60, and is maintained until the associated primitive functions 34, 36, 38 and 46 are completed.

In the multiprocessor operation, all of the functions and primitive functions are executed as described above except for the Switch, Suspend and ThreadDelete functions.

Whenever the Switch primitive function 46 is called by a function or primitive function executing on one of the CPUs, the Switch primitive function responds by providing the highest priority thread from the run list for execution by the CPU of the calling thread. As a result, multiple threads from the run list can be executed concurrently by multiple (N) CPUs 14. To guarantee that each of the N CPUs 14 will always have a thread to execute, the system maintains an extra set of N dispatch classes, each of which contains exactly one "null" thread of lowest priority. Each time they are dispatched, these threads are programmed to cause the CPU to become idle until they are interrupted by another CPU as described below, after which they call the Promote and Switch primitive functions to obtain a productive thread for the CPU to execute in place of the null thread.

There is the additional concern that the target thread of the Suspend or ThreadDelete functions may be currently executing on another CPU when it is desired to suspend or delete the target thread. It is necessary to stop the suspending thread from execution until it is certain that the target thread is no longer executing. Thus, the ThreadSuspend function examines a processor ID field in the TSD of the target thread to determine if the target thread is currently executing (decision block 258 of FIG. 12). If not, the ThreadSuspend function suspends the target thread as noted above for the single processor environment. However, if the target thread is currently executing in a multiprocessor embodiment, then the ThreadSuspend function sends an interrupt to the target thread's CPU to call the Switch primitive function (step 272). In response, the target thread's CPU runs interrupt code which calls the Switch primitive function. The ThreadSuspend function waits on the processor ID field of the target TSD to indicate that the target thread is no longer executing (step 274). Then, the ThreadSuspend function proceeds to step 259 to continue processing as described above.

When the ThreadDelete function is called in a multiprocessor environment, the ThreadDelete function determines if the target thread is currently executing on another CPU by reading the processor ID field of the TSD (decision block 468 of FIG. 15). If so, the ThreadDelete function sends an interrupt to the target thread's CPU (step 470). The interrupt includes a request for the target thread to block itself. The interrupt handler is programmed to comply with the request by calling the Block primitive function. Meanwhile, the ThreadDelete function waits on the processor ID field of the target thread's TSD (step 472). After the target thread has been blocked, the ThreadDelete function continues at step 404 described above.

The foregoing mode of operation utilizing multiple processors 14a-c permits only one thread from each dispatch class to run at any one time. This allows multiple threads from separate dispatch classes to run concurrently on multiple CPUs while respecting the preemption rules that apply within each dispatch class. However, another mode of operation of the present invention permits multiple program threads from the same dispatch class to run concurrently. In this mode of operation, when an application program creates a dispatch class, the application program designates the maximum number of program threads from the dispatch class which are permitted to run concurrently. This maximum number is stored as a "max current thread no." field in the DCD (FIG. 3). The DCD also includes a list of current TSDs, the number of current threads and an anchor for all of the threads. After a change which affects the dispatch class, for example, a call to the ThreadCreate, Block, Unblock, Suspend, Resume or ThreadDelete function, the Promote primitive function is called which proceeds to read from the DCD the maximum current thread number, the number of current threads, and the list of current threads (decision block 98 and step 140 of FIG. 7). If there are fewer current threads than the maximum current thread number, (decision block 142), then the Promote primitive function 34 selects one or more additional unblocked and unsuspended program threads of the highest priority to make current such that the total number of current threads will equal the maximum current thread number (step 144). Next, as noted above, the Promote primitive function 34 calls the Schedule primitive function 36 in step 104 (once for each additional thread) to copy these additional TSDs onto the run list. Finally, the Promote primitive function 34 updates the number of current threads field to equal the number of current threads (step 150), and returns to the caller (step 112).

In another implementation of operating system 10 it is possible to characterize each dispatch class by both a minimum and a maximum processor count. The minimum processor count defines the minimum number of processors that must be available for threads in the class to be dispatched and such threads would then execute simultaneously; no member of the class is allowed to run unless that minimum number of processors is available for the threads of that class. The maximum processor count specifies the maximum number of processors on which members of the class will be allowed to run simultaneously, and thus limits the degree of parallel execution of the threads in the class. When the maximum processor count is one, the members of the class behave like "co-routines" with explicit sequencing; when the minimum processor count is equal to the size of the class, the class may be viewed as a "task force" with guaranteed co-scheduling.

The following fields are added to each DCD to implement minimum and maximum processor count attributes:

m—minimum processor count for this class;
M—maximum processor count for this class;
x—number of threads from this class currently executing;
s—number of threads from this class on the (session) run list 32; and
c—number of threads on a class run list 798 for this class. This class run list is an additional run list which is structured similarly to run list 32 and serves as a staging ground for collection of TSDs from a dispatch class whose minimum processor count is greater than one. The TSDs are collected on the class run list until the minimum processor count of threads is promoted and scheduled onto the session run list.

The constraints on the possible values of the above variables and parameters are as follows:

$1 <= m <= \min(M, \text{number of processors})$;
either $x = 0$ or $m <= x <= M$;
if $x = 0$, then either $s = 0$ or $m <= s <= M$;
if $x > 0$, then $0 <= s <= M - x$;

if $x=0$ and $s=0$, then $0< =c<m$; and
if $0<s<M-x$, then $c=0$.

Figure 19:
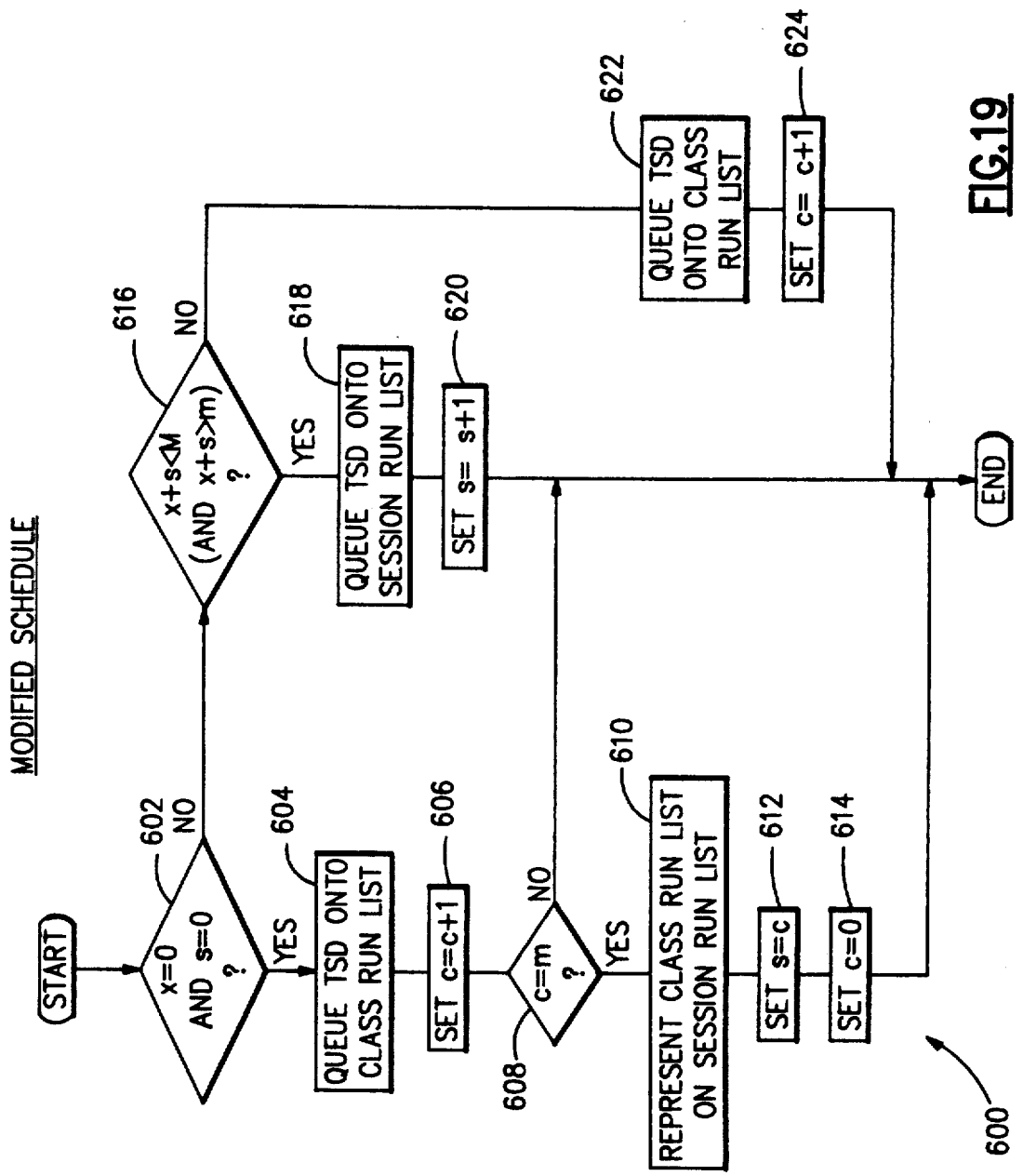
FIG. 19 is a flowchart illustrating a ModifiedSchedule primitive function within the operating system of FIG. 1.

To begin the process of queueing a TSD on its class run list for a dispatch class with a minimum processor count greater than one, the Promote primitive function is called. In this implementation of operating system 10, step 98 of FIG. 7 leads to step 140 because the maximum current no. field should equal the maximum processor count and is greater than one. Then the DCD is read in step 140 and decision block 142 follows. In decision block 142 the question is whether there are fewer current threads than the maximum processor count, and "current threads" means threads on the session run list plus threads which are chained from the session run list as described below plus the threads on the class run list. If there are fewer current threads than the maximum processor count, then additional available threads are identified as being current (step 144). Then the ModifiedSchedule primitive function 53 illustrated in FIG. 19 is called (step 143) instead of the original Schedule primitive function for each additional available thread.

In decision block 802, the ModifiedSchedule primitive function determines if $x=0$ and $s=0$, i.e. if there are no threads from the dispatch class either executing on a CPU or queued on the session run list 32. If $x=0$ and $s=0$, then the ModifiedSchedule primitive function queues one of the available TSDs onto the class run list 798 (step 804) and increments the parameter c (step 806). If the number of TSDs on the class run list is less than the minimum processor count, decision block 808 leads to the end of the ModifiedSchedule primitive function. As noted above, for each thread in the dispatch class which is available for execution, the Promote primitive function calls the ModifiedSchedule primitive function, and for the first $m-1$ of these TSDs, steps 802-806 are repeated. For the next TSD which is scheduled by the ModifiedSchedule primitive function, decision block 808 leads to step 810 in which the ModifiedSchedule primitive function represents the class run list 798 on the session run list 32 as described below (step 810), and sets the parameter s equal to c (step 812) and the parameter c equal to zero (step 814), to reflect this representative transfer from the class run list to the session run list.

After one TSD from the class run list is queued onto the session run list or one or more of such TSDs begin to execute, and another TSD is promoted, decision block 802 leads to decision block 816 in which the ModifiedSchedule primitive function determines if the number of executing threads (if any) from this dispatch class plus the number of threads from this dispatch class on the session run list are less than the maximum processor count. If so, the ModifiedSchedule primitive function queues this latest TSD directly onto the session run list 32 (step 818) and increments the parameter s to reflect this queueing (step 820). Steps 818 and 820 are repeated for each additional TSD which is promoted from the same dispatch class until the number of executing threads and threads on the session run list from this dispatch class equal the maximum processor Subsequently promoted TSDs (after the maximum processor count is attained) are queued onto the class run list (step 822), and the parameter c is incremented (step 824).

The way the TSDs from the class run list are represented on the session run list in steps 810 and 822 depends on the values of x and s, as follows:

a. If $x=0$ and $s=m$, then only the lowest priority of the m runnable TSDs appears on the run list; the remaining $m-1$ TSDs are chained from it. This configuration is the result of step 810 described above. The chained TSDs are considered part of the session run list and the Switch primitive function considers these chained TSDs for execution. When this lowest priority thread is the highest priority thread on the run list and a CPU becomes available for it, then the other $m-1$ higher priority threads which are chained from the representative preempt $m-1$ other executing threads which have a lower priority.

b. If $x=0$ and $s>m$, then the first m TSDs are represented as above by the lowest priority of the m priority TSDs, and the remaining s-m TSDs, whose run list position is behind the m-th TSD, are queued directly on the session run list. Each of these remaining s-m TSDs will be directly queued on the session run list in step 618 after the representative if their priority level is below that of the m-th TSD.

c. If $x> =m$, then up to $M-x$ TSDs from the class may appear on the session run list in priority order.

A class is dispatched at the point when its m-th thread comes to the top of the run list. At that point, three cases arise:
1) There are m idle processors available, in which case the m TSDs can be run immediately on these m processors.
2) There are $i<m$ idle processors and $p=m-i$ other processors running threads of lower priority than the m highest priority thread of the class that require dispatching. In this case, the executing threads on the other processors can be preempted to let the m threads of the new class run.
3) The number of idle and preemptable processors is insufficient to run the class. The Switch primitive function described above can be modified to handle this deficiency by implementing either of the following four options:
   a. Refuse to dispatch any other TSD, even one of higher priority that subsequently becomes dispatchable, until it has first dispatched the waiting class.
   b. Refuse to dispatch any lower priority TSD now, but resume normal dispatching rules if a higher priority TSD subsequently becomes dispatchable.
   c. Attempt to dispatch a lower priority TSD now, with the intention of being able to preempt it whenever enough other processors become available, and resume normal dispatching rules if a higher priority TSD subsequently becomes available.
   d. Dispatch only lower priority TSDs (which can later be preempted) until the ready class has been dispatched.

The other requisite modification to the Switch primitive function is to halt execution of the entire class whenever the number of executing threads is about to drop below m. This is implemented by tracking the number of threads which are removed from the CPUs pursuant to calls to the Switch primitive function.

It should also be noted that the use of the class run list may optimize the Promote primitive function when the minimum processor count and maximum processor count both equal one, because the class run list contains only available threads and its use avoids repeated searches through the dispatch class for available threads.

Based on the foregoing, an operating system according to the present invention has been disclosed. However, numerous substitutions and modifications can be made without deviating from the scope of the present invention. Therefore, the invention has been disclosed by way of illustration and not limitation, and reference should be made to the following claims to determine the scope of the invention.

We claim:

1. A computer system for scheduling execution of program threads of one or more application programs based on parameters specified by the application program(s) and executing the scheduled program threads, said system comprising:

at least one processor;

first means, responsive to specifications by said application program(s) that one plurality of said program threads is assigned to one class and another plurality of said program threads is assigned to another class, for storing indications that said one plurality of program threads is assigned to said one class and said other plurality of program threads is assigned to said other class;

second means, responsive to specifications by said application program(s) of a priority level for each of said program threads, for storing an indication of the priority level of each of said program threads;

third means, responsive to specification by an application program or program thread that a program thread is unavailable for execution, for storing an indication that said program thread is unavailable for execution and responsive to a specification by an application program or another program thread that said program thread is available for execution, for storing an indication that said program thread is available for execution; and means, coupled to the first, second and third storing means and said processor processors, for selecting the highest priority available program thread from each of said classes for execution by said processor or processors and scheduling said selected program threads for execution by said processor or processors in order of priority level such that the highest priority, selected program thread is executed first; and wherein the selecting and scheduling means includes means for preempting execution of a program thread from either of said classes with a higher priority level program thread from the other class, said higher priority level program thread from said other class being made available or assigned to said other class after selection by the selecting means of another program thread from said other class with a lower priority than the executing program thread, said selecting means subsequently selecting said higher priority program thread from said other class in place of said lower priority program thread from said other class for execution by the processor; and means for preventing a program thread in said one class, which was made available or assigned to said one class after selection by the selecting means of another, lower priority program thread from said one class for execution, from preempting execution of said other, lower priority selected program thread from said one class.

2. A computer system as set forth in claim 1 wherein the scheduling means creates a run list of the selected program threads and orders said selected program threads on said run list for execution based on priority level; and further comprising means, responsive to a specification by an application program of a number greater than one of the program threads from said one class for representation on said run list, for selecting said number greater than one of the highest priority, available program threads from said one class for representation on said run list.

3. A computer system as set forth in claim 1 wherein the scheduling means creates a run list of the selected program threads and orders said selected program threads on said run list for execution based on priority level; and the preventing means prevents selection for said run list of the program thread in said one class which was made available or assigned to said one class after selection by the selecting means of the other, lower priority program thread from said one class, before execution of said other, lower priority program thread.

4. A computer system as set forth in claim 1 wherein the preventing means prevents more than one program thread from any class from being scheduled for execution at any one time.

5. A computer system as set forth in claim 2 wherein said system comprises said number of said processors, and further comprising means, coupled to one or more of said processors, for selecting said number of the highest priority, available program threads from said one class for execution on said number of said processors.

6. A computer system as set forth in claim 1 further comprising means, responsive to a request by an executing program thread to cease execution, for ceasing execution of said program thread; and wherein the third means responds to said request by storing an indication that said program thread is unavailable for execution; and the selecting and scheduling means responds to said request to cease execution of said currently executing program thread, by selecting for subsequent execution the highest priority, available program thread from the same class as the program thread which ceases execution.

7. A method for scheduling execution of program threads of one or more application programs based on parameters specified by the application program(s) and executing the scheduled program threads on one or more computer processors, said method comprising the steps of:

receiving specifications by said application program(s) that one plurality of said program threads is assigned to one class and another plurality of said program threads is assigned to another class, and in response, storing indications that said one plurality of program threads is assigned to said one class and said other plurality of program threads is assigned to said other class;

receiving specifications by said application program(s) of a priority level for each of said program threads, and in response, storing an indication of the priority level of each of said program threads;

receiving specification by an application program or program thread that a program thread is unavailable for execution, and in response, storing an indication that said program thread is unavailable for execution and receiving a specification by an application program or another program thread that said program thread is available for execution, and in response, storing an indication that said program thread is available for execution;

selecting the highest priority available program thread from each of said classes for execution by said processor or processors and scheduling said selected program threads for execution by said processor or processors in order of priority level such that the highest priority, selected program thread is executed first;

preempting execution of a program thread from either of said classes with a higher priority level program thread from the other class, said higher priority level program thread from said other class being made available or assigned to said other class after selection by the selecting means of another program thread from said other class with a lower priority than the executing program thread;

subsequent to said preempting step, selecting said higher priority program thread from said other class in place of said lower priority program thread from said other class for execution by the processor; and preventing a program thread in said one class, which was made available or assigned to said one class after selection of another, lower priority program thread from said one class of execution, form preempting execution of said other, lower priority selected program thread from said one class.

8. A method as set forth in claim 7 wherein the scheduling step creates a run list of the selecting program threads and orders said selected program threads on said run list for execution based on priority level; and further comprising the steps of receiving a specification by an application program of a number greater than one of the program threads from said one class for representation on said run list, and in response, selecting said number greater than one of the highest priority, available program threads from said one class for representation on said run list.

9. A method as set forth in claim 7 wherein the scheduling step creates a run list of the selected program threads and orders said selected program threads on said run list for execution based on priority level; and the preventing step prevents selection for said run list of the program thread in said one class which was made available or assigned to said one class after selection of the other, lower priority program thread from said one class, before execution of said other, lower priority program thread.

10. A method as set forth in claim 7 wherein the preventing step prevents more than one program thread from any class from being scheduled for execution at any one time.

11. A method as set forth in claim 8 further comprising the step of selecting said number of the highest priority, available program threads from said one class for execution on said number of processors.

12. A method as set forth in claim 7 further comprising the step of:

receiving a request by an executing program thread to cease execution, and in response, ceasing execution of said program thread, storing an indication that said program thread is unavailable for execution, and selecting for subsequent execution the highest priority, available program thread from the same class as the program thread which ceases execution.

* * * * *